Dec. 10, 1929.     K. E. PEILER     1,738,923
APPARATUS FOR FEEDING MOLTEN GLASS
Original Filed Jan. 27, 1923    2 Sheets-Sheet 1
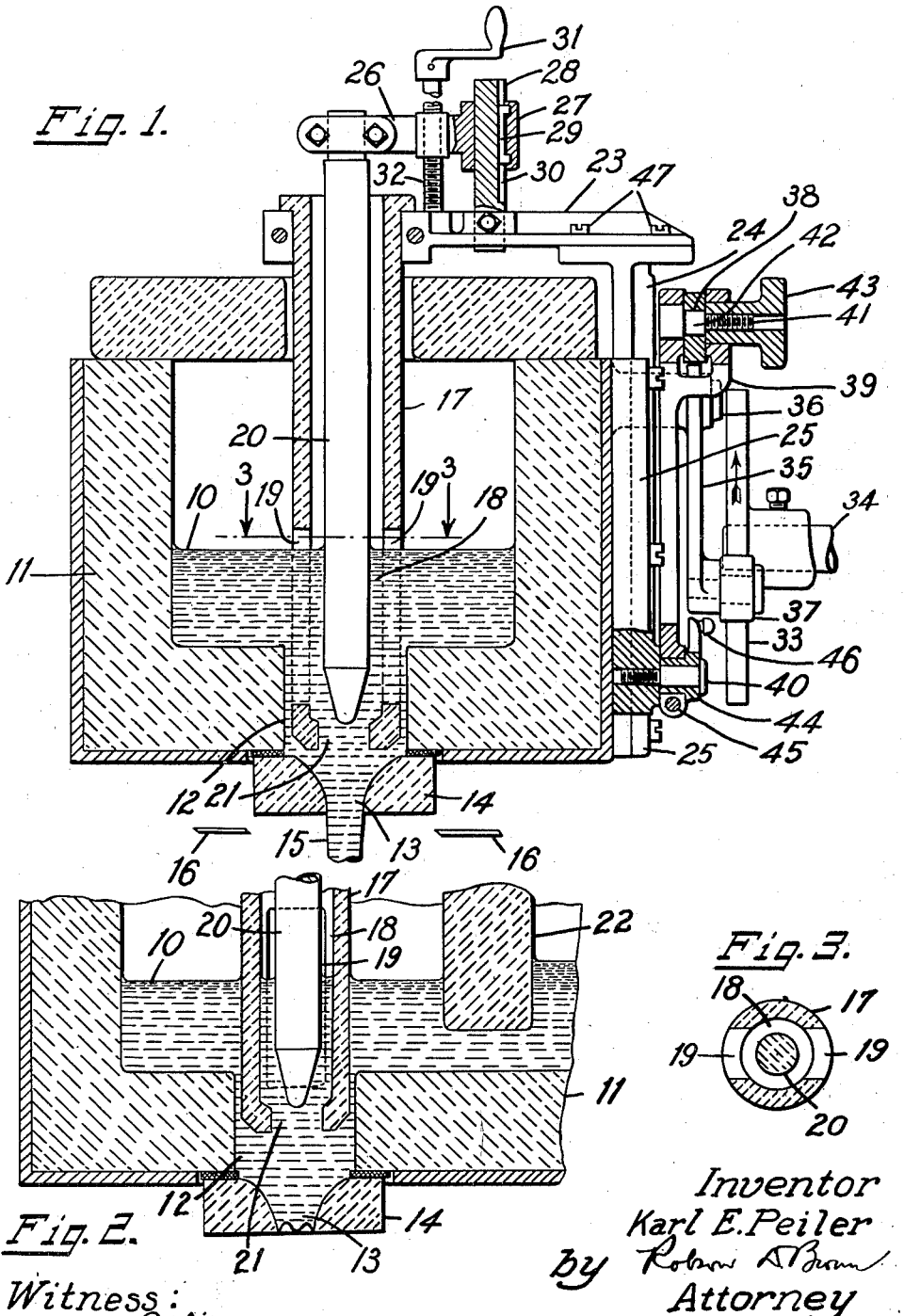
Inventor
Karl E. Peiler
by Robert A Brown
Attorney
Witness:
James J. White

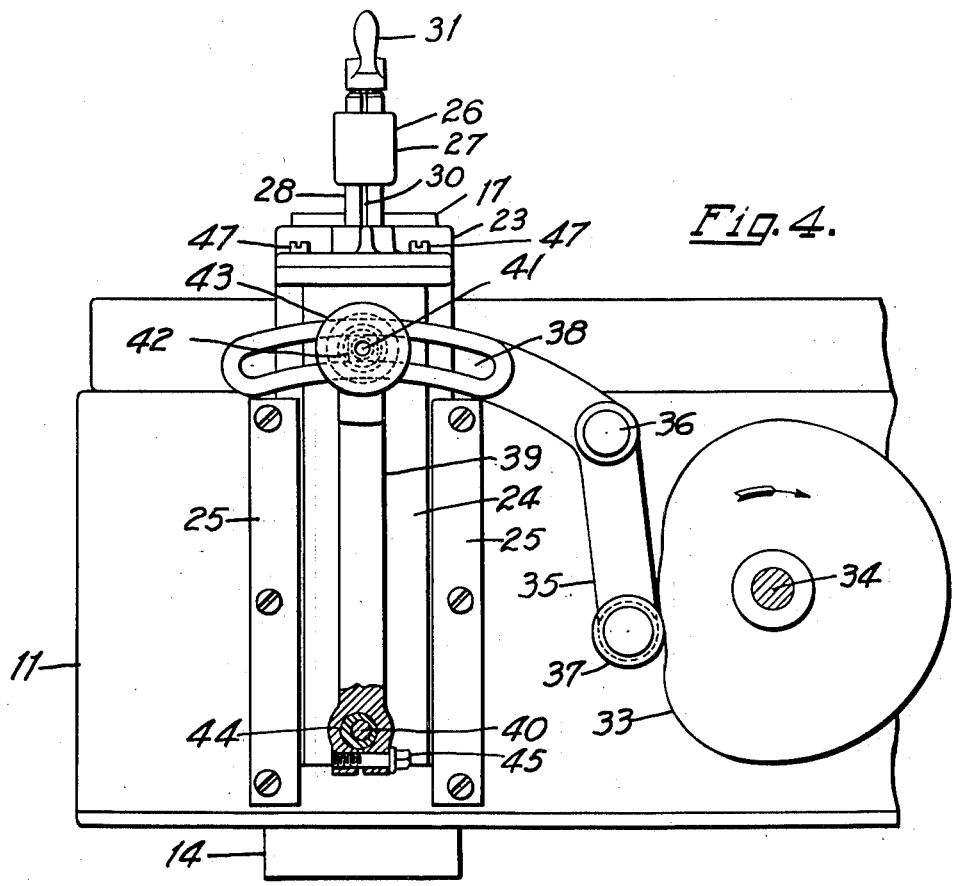

Patented Dec. 10, 1929

1,738,923

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

APPARATUS FOR FEEDING MOLTEN GLASS

Original application filed January 27, 1923, Serial No. 615,308, now Patent No. 1,675,819, dated July 3, 1928. Divided and this application filed February 17, 1927. Serial No. 168,952.

This invention relates to apparatus for separating molten glass into mold charges, its object being to feed the glass in successive suspended masses of any predetermined size and shape for delivery to the molds of glass shaping machines, so as to adapt the feeding apparatus to produce mold charges of a size and shape best suited for the production of any of the numerous sizes and shapes of commercial glassware.

This application is a division of my application, Serial #615,308, filed January 27, 1923 on which Patent No. 1,675,819 was granted July 3, 1928, and is particularly directed to features specific to Figures 1 to 4 inclusive of the original application. I have retained in the original application claims generic to both forms shown therein and specific to the form shown in Figures 5 and 6 thereof.

By the present method the molten glass is flowed or fed from the forehearth of a furnace or other receptacle through the interior of a reciprocating hollow plunger having adjustable means for throttling or regulating the resistance to the flow of glass therethrough or through the outlet over which the plunger operates. The resistance regulating means may be given any desired shape and size and may move with the plunger or be held stationary. It is preferably in the form of a valve, which in one case is adapted to throttle the plunger outlet and in another case it is adapted to throttle the container outlet. In each of these cases it may be adjusted so as to increase or diminish the resistance to the flow of glass to or through the discharge outlet, or to discontinue such resistance altogether.

The glass flowing into the plunger is sequestered in an annular column formation therein, over and in alignment with the outlet, the top of the column being surrounded by and fed directly from the interior of the main body of glass, which thus forms a heated environment around the column, besides serving as a replenishing source for the top of the column. The effect of the column movements, either forwardly or backwardly is assisted by adhesive contact of its surfaces with the interior surrounding wall of the moving plunger, which is of advantage in controlling the movement of the glass at the outlet.

Other features of the invention will appear from the description to follow.

In the drawings:

Figure 1 is a sectional elevation of a machine embodying the invention, with the hollow plunger shown at about its lowermost position;

Fig. 2 is a fragmentary sectional elevation with the plunger shown at about its uppermost position;

Fig. 3 is a sectional plan on line 3—3 of Fig. 2;

Fig. 4 is a side elevation looking at the right of Fig. 1, showing the plunger operating mechanism.

The supply of molten glass 10 may flow from a furnace or melting tank of any well known type to the container 11, which may form a forehearth to the furnace. The container is provided with a well 12 terminating in a submerged outlet 13 formed in the removable ring 14. The size of the outlet is adapted to the size of the charges to be made, one of the charges being indicated at 15 ready for severance by the shear blades 16 which may be of any known construction, and adjustable to sever at any desired height and in desired time relation to the plunger movements.

Projecting into the outlet well 12 is a hollow plunger 17, preferably adapted to fit the well as closely as practical, consistent with satisfactory operation of the plunger. The intention is to flow all or the greater portion of the glass forming the mold charges through the plunger. Therefore, the glass in the well outside of the plunger serves merely or mainly as a packing between the plunger and wall of the well to enable the plunger to operate as a piston therein.

Communicating with the passage 18 of the plunger are one or more inlet openings 19 through the plunger wall, of the required flow capacity, which remain constantly open for the inflow of glass to the submerged outlet 13. These inlets extend both above and below the top of the well, thus allowing a free inflow of glass to the plunger at all positions thereof.

The size of the internal flow passage 18 of the plunger may conveniently be regulated by the insertion therein of different size flow regulating members 20, adjustable to both vary the resistance to flow in the passage and to act as a valve for regulating the size of the discharge opening 21 of the plunger, which is preferably made about equal to the size of the container outlet 13. If the regulating member is raised to a point where it no longer throttles the plunger outlet 21, it is still capable of adjustment to different points above the plunger outlet and can thereby be made to offer different degrees of resistance to the flow of glass in the plunger, and hence continues to act as a flow resistance regulating member independently of its function as a valve.

By adjusting the regulating member to throttle the plunger outlet 21, various retractive and extrusive effects may be produced at the container outlet, depending upon the results desired in the formation of the suspended gathers.

If desired, the throttling of the plunger outlet 21 may be used to vary the weight of the mold charges, but it is preferable to use this throttling only for shape control and to use other means for weight control.

The hollow plunger may be operated in conjunction either with a fixed or an adjustable head of glass, because adjusting the head is a convenient way of regulating the weight of the charges. This head may be regulated by any suitable means, such as the gate 22, which may be adjusted by any suitable means not shown.

As the plunger rises it tends to create a void in the well beneath it, which void may be satisfied by the inflow of the glass flowing downwardly through the plunger, or by the glass retarded or retracted in the container outlet, or by a combination of both, according to the character and especially the speed of the plunger movements. When the plunger is given a rapid upward movement, the retarding or retractive effect through the container outlet will be greater than if the plunger is moved slowly.

The downward or extrusion impulses of the plunger are also utilized to control the shape of the mold charge, both as to its upper end and through its body while it is passing through and accumulating beneath the container outlet. Stronger downward impulses increase the diameter of the portions of the gather then being extruded. Thus the movements of the plunger may be adapted to produce the desired shape of the mold charges, the plunger being reciprocated periodically at the times, and to the extent required for assisting, retarding, and, if desired, reversing the gravitational flow of glass through the container outlet, any or all of which influences may be utilized to control and vary the shape of the suspended gathers or mold charges to the desired extent.

The desired changes in the shapes of the charges may also be effected by proportioning the discharge passages of the container and internal flow plunger, or by varying the character of the movements of the plunger, or the time and amplitude of its stroke, or by varying its working range within the well or submerged discharge passage, these variations being determined by the contour of the cam for operating the plunger, different shaped cams being employed to produce different results.

The severing mechanism will be timed to correspond to the formation of the charges, the remaining stub from which the charge is severed being preferably retracted into the container outlet by the upward movement of the plunger, the retraction beginning either before, after, or during severing as desired, depending upon the shape of charge desired.

The plunger tube 17 is adjustably clamped upon an arm 23, removably connected with a reciprocally mounted bracket 24 guided by ways 25 on the container 11.

The regulating member 20 is suitably clamped upon an arm 26 having a bearing portion 27 mounted to slide upon a post 28 extending upwardly from the arm 23. The arm 26 is adapted to hold the member 20 properly centered within the plunger. Rotation of the arm 26 upon the post 28 is prevented by a key 29 inserted in a splineway 30 formed in the post, the key being preferably extended longitudinally through the bearing 27 and having projections at its ends extending into notches formed in the ends of the bearing. Adjustment of the regulating member 20 longitudinally of the plunger is effected by turning the handle 31 of a feed screw 32 threaded through the arm 26 and extending into engagement with the plunger carrying arm 23.

Reciprocation of the plunger 17 and the parts supporting it is effected by an adjustable cam 33 on a suitably driven shaft 34 through connections, comprising a lever 35 mounted on a fixed stud 36 and having a roll 37 engaging the cam 33. The horizontal arm of the lever is slotted at 38 and adjustably connected with a link 39 pivotally connected at 40 to the plunger carrying bracket 24. The connection between the link 39 and lever 35 is adjustable and comprises a stud 41 having a square central portion 42 slidable in the slot 38 of the lever and also a threaded portion carrying a hand wheel 43 by which the stud may be clamped upon the lever. The link 39 is forked to receive the slotted arm of the lever, one side of the fork being pivoted upon the head of the stud 41 and the other upon the hub of the hand wheel 43. This construction permits the connection between the link to be adjusted toward or from the pivot 36 of the lever while the machine is in operation, thus varying the effective leverage of the lever and thereby varying the length of the stroke of the plunger. The length of the stroke of the plunger may be varied without changing its lowest position, by making the slot 38 in the form of an arc having its center at 40 when the plunger is at its lowermost position.

In order to effect adjustment of the plunger 17 relative to the outlet, so that its range of vertical movement within the well may be slightly varied, the pivot pin 40 of the link 24 is provided with an eccentric bushing 44 rotatable upon the pivot pin. The bushing extends through the lower end of the link the latter being split and clamped upon the bushing by tightening the clamp screw 45. The bushing is provided with a handle 46 by which it may be rotated to effect the desired adjustment of the plunger longitudinally within the wall.

The cam 33 is removably mounted upon the shaft 34 in order that it may be readily replaced by other cams for varying the plunger movements to regulate the discharge of the glass, the contour of each cam being adapted to afford the particular results desired in the operation of the machine from time to time.

Where it is desired to feed mold charges to two or more shaping machines producing articles of different shapes or sizes, or both, the plunger operating cam may be provided with the desired number of lobes of the proper contours, so that for each revolution of the cam shaft a series of mold charges of the required shapes and sizes will be produced.

The arm 23 and the plunger and other parts carried thereon may be readily detached from the bracket 24 as a unit, by unscrewing the bolts 47 connecting the arm with the bracket.

The illustrated embodiment of the invention may be modified in construction, arrangement, and mode of operation by those skilled in the art, without departing from the scope of the invention as defined in the appended claims.

I claim:

1. In apparatus for segregating mold charges from a body of molten glass, the combination with a glass container having a submerged discharge outlet, a movable support, a tubular member mounted on the support and projecting into the glass in alignment with the outlet, a solid member mounted on the support and located within the tubular member, means for causing a relative adjustment of the members on the support, means for adjusting the support relative to the outlet, and means for moving the support to reciprocate the members toward and from the outlet.

2. In apparatus for segregating mold charges from a body of molten glass, the combination with a glass container having a well terminating in a discharge outlet, a tubular member projecting constantly into the glass in the well, a solid member within the tubular member and means for reciprocating both of said members.

3. In apparatus for segregating mold charges from a body of molten glass, the combination with a glass container provided with a well terminating in a discharge outlet, the tubular member projecting into the well and fitting the well closely enough to prevent appreciable discharge of glass past the outside of the plunger, said plunger being adapted to permit a flow of glass internally thereof to the outlet, a solid member within said tubular member and means for reciprocating both of said members toward and from the outlet.

4. In apparatus for segregating mold charges from a body of molten glass, the combination with a glass container provided with a well terminating in a discharge outlet, a reciprocating tubular member projecting into the well and fitting it closely enough to prevent appreciable discharge of glass past the outside of the member, said member being adapted to permit a flow of glass internally thereof to the outlet and having its lower end constantly within the well, a solid member within said tubular member and means for reciprocating both of said members toward and from the outlet.

5. In apparatus for segregating mold charges from a body of molten glass, the combination with a glass container having a discharge outlet, a tubular member projecting into the glass toward the outlet and having an internal flow passage, a solid member within said tubular member for regulating the effective size of the discharge end of said flow passage and means for reciprocating said members together.

6. In apparatus for segregating mold charges from a body of molten glass, the combination with a glass container having a discharge outlet, a tubular member projecting into the glass in alignment with the outlet and having an internal flow passage, a solid member within said tubular member for regulating the resistance to the flow of glass in said internal flow passage and unitary means for reciprocating said members together.

7. In apparatus for segregating mold charges from a body of molten glass, the combination with a glass container having a well terminating in a discharge outlet, a tubular member projecting into the glass in the well, a solid member within said tubular member, means for effecting a relative adjustment of the tubular member and the solid member and means for reciprocating said members together toward and from the outlet.

8. In apparatus for segregating mold charges from a body of molten glass, the combination with a glass container having a well terminating in a discharge outlet, a tubular member projecting into the glass in the well and having an internal passage for the flow of glass to the well, a solid member within said tubular member spaced from the inner side walls of the latter, means for effecting a relative adjustment of the tubular member and the solid member to vary the resistance to flow of glass in said tubular member, and means for reciprocating said members.

9. In apparatus for segregating mold charges from a body of molten glass, the combination with a glass container having a well terminating in a discharge outlet, a tubular member projecting constantly into the glass in the well, a solid member within said tubular member, and means for reciprocating said members as a unit.

10. In apparatus for segregating mold charges from a body of molten glass, the combination with a glass container having a well terminating in a discharge outlet, a tubular member projecting into the glass in the well in alignment with the outlet and having an internal passage for the flow of glass to the well, a solid member within said tubular member, and unitary means for reciprocating said members together.

11. In apparatus for feeding molten glass, the combination with a glass container provided with a submerged outlet, of a hollow plunger movable in the glass relative to the outlet and having an internal flow passage communicating with the glass above its discharge end at all positions of the plunger, a solid member within said hollow plunger, and means for reciprocating both said hollow plunger and said solid member.

Signed at Hartford, Conn., this 16th day of February, 1927.

KARL E. PEILER.